(12) United States Patent
Weston et al.

(10) Patent No.: US 12,728,737 B2
(45) Date of Patent: Sep. 8, 2026

(54) POWER TRANSFER ENABLED WINCH SYSTEM

(71) Applicant: Ford Global Technologies, LLC, Dearborn, MI (US)

(72) Inventors: Keith Weston, Canton, MI (US); Todd Ansbacher, Westland, MI (US)

( * ) Notice: Subject to any disclaimer, the term of this patent is extended or adjusted under 35 U.S.C. 154(b) by 14 days.

(21) Appl. No.: 19/055,171

(22) Filed: Feb. 17, 2025

(65) Prior Publication Data

US 2026/0241810 A1 Aug. 20, 2026

(51) Int. Cl.

*B60L 53/12* (2019.01)
*B60L 50/60* (2019.01)
*B60L 53/126* (2019.01)
*B60L 53/34* (2019.01)
*B60L 53/38* (2019.01)
*B62D 43/04* (2006.01)
*H02J 50/10* (2016.01)

(52) U.S. Cl.

CPC ............. *B60L 53/12* (2019.02); *B60L 53/126* (2019.02); *B60L 53/34* (2019.02); *B60L 53/38* (2019.02); *B62D 43/045* (2013.01); *H02J 50/10* (2016.02); *B60L 50/60* (2019.02); *B62D 43/04* (2013.01)

(58) Field of Classification Search

None

See application file for complete search history.

(56) References Cited

U.S. PATENT DOCUMENTS 8,466,654 B2 * 6/2013 Cook ..................... B60L 53/60 320/108
11,318,857 B2 5/2022 Westfall et al.
12,030,354 B2 7/2024 Salter et al.
12,139,030 B1 11/2024 Booth et al.
12,145,461 B2 * 11/2024 Ortiz ..................... B60L 53/38
12,168,398 B2 12/2024 Kinsey
12,311,703 B2 * 5/2025 Kuwayama ............. H01F 38/14
2004/0134694 A1 7/2004 Allen et al.
2007/0131505 A1 * 6/2007 Kim ..................... B60L 5/005 191/14
2008/0258682 A1 10/2008 Li (Continued)

FOREIGN PATENT DOCUMENTS

EP 3546278 A1 10/2019

OTHER PUBLICATIONS

Debbie Gillespie, Guide to Retractable EV Charging Cable Reels, https://www.evcableshop.co.uk/blogs/blog/guide-to-retractable-ev-charging-cable-reels, Jan. 21, 2024, pp. 1-12.

(Continued)

*Primary Examiner* — Todd Melton

(74) *Attorney, Agent, or Firm* — Frank Lollo; Eversheds Sutherland (US) LLP

(57) ABSTRACT

A vehicle including a vehicle main battery, a wheel and tire assembly, an inductive charging device, and a cable is disclosed. The wheel and tire assembly may include a tire and a wheel. The inductive charging device may be mounted in the wheel and tire assembly. The inductive charging device may receive power from an inductive power source and transfer power to the vehicle main battery. The cable may vertically move the wheel and tire assembly between a lowered position and a stowed position, and enable power transfer between the wheel and tire assembly and the vehicle main battery.

20 Claims, 5 Drawing Sheets

(56) References Cited

U.S. PATENT DOCUMENTS

| | | | | |
|---|---|---|---|---|
| 2011/0198137 | A1 | 8/2011 | De Paschoal | |
| 2014/0358343 | A1 | 12/2014 | Chastang, Jr. | |
| 2016/0052415 | A1 | 2/2016 | Bell et al. | |
| 2017/0349039 | A1 | 12/2017 | Rayner et al. | |
| 2019/0141467 | A1 | 5/2019 | Breed | |
| 2020/0087126 | A1 | 3/2020 | Perlstein et al. | |
| 2021/0201357 | A1 | 7/2021 | Singhal et al. | |
| 2022/0324337 | A1* | 10/2022 | Flaqueire | B60L 53/12 |
| 2023/0017046 | A1* | 1/2023 | Öhman | B60L 53/35 |
| 2023/0211836 | A1* | 7/2023 | Durbin | B62D 43/045 414/466 |
| 2024/0348101 | A1 | 10/2024 | Seong | |
| 2025/0128629 | A1* | 4/2025 | Sztabnik | B60L 53/57 |

OTHER PUBLICATIONS

Ronald K. Jurgen, Less sizzle, more beef for Detroit in '86, https://ieeexplore.ieee.org/document/6370845, Oct. 31, 1985, pp. 77-83.

William J. Mitchell, et al., The New DNA of the Automobile, https://ieeexplore.ieee.org/document/6277752, 2010, pp. 9-35.

P. T. Krein, et al., Packing and Performance of an IGBT-Based Hybrid Electric Vehicle, https://ieeexplore.ieee.org/abstract/document/572355, Oct. 20-21, 1994, pp. 47-52.

Emanuel G. Marques, et al., Inductive Power Transfer In Electric Vehicles, https://vtmagazine.ieee.org/2023/12/29/inductive-power-transfer-in-electric-vehicles-past-and-future-trends/, pp. 111-122.

Chris Mi, Ph.D., Hybrid and Plug-in Hybrid Electric Vehicle Systems, University of Michigan-Dearborn, ISIE 2010, IEEE International Symposium on Industrial Electronics, Jul. 4-7, 2010, pp. 1-111.

Susan Handy, et al., 10 Technology and they said Segways were going to solve everything, https://ieeexplore.ieee.org/abstract/document/10355363, 2023, Abstract.

M.J. Riezenman, et al., Electric vehicles-pursuing efficiency, https://ieeexplore.ieee.org/document/166493, Nov. 30, 1992, Abstract.

Hrvoje Vdovic, et al., Automotive Software in Connected and Autonomous Electric Vehicles: A Review, https://ieeexplore.ieee.org/document/8901126, Nov. 14, 2019, Abstract.

Ashok Jhunjhunwala, et al., Electric Vehicles in India: A Novel Approach to Scale Electrification, https://ieeexplore.ieee.org/abstract/document/8546812, Nov. 27, 2018, Abstract.

William J. Mitchell, et al., Reinventing the Automobile for Urban Use, https://ieeexplore.ieee.org/document/6277750, 2010, pp. 52-83.

* cited by examiner 100
114
106
110
304
100
106
G
110
302

POWER TRANSFER ENABLED WINCH SYSTEM

FIELD

The present disclosure relates to electric or hybrid vehicles, and more particularly to a power transfer-enabled winch system for an electric or hybrid vehicle.

BACKGROUND

In many vehicles such as pickup trucks, spare tires are often stored in a vehicle undercarriage, to maximize space in the bed or cargo area. Typically, the spare tire is connected to the undercarriage via a mechanical winch system (or a hoist cable). The mechanical winch system includes a cable that moves the spare tire vertically, such as between a raised/stowed position and a lowered position, which facilitates a user to easily store and access the spare tire. The mechanical winch system uses a drum or pulley to wind and unwind the cable to move the spare tire vertically between the raised/stowed position and the lowered position.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
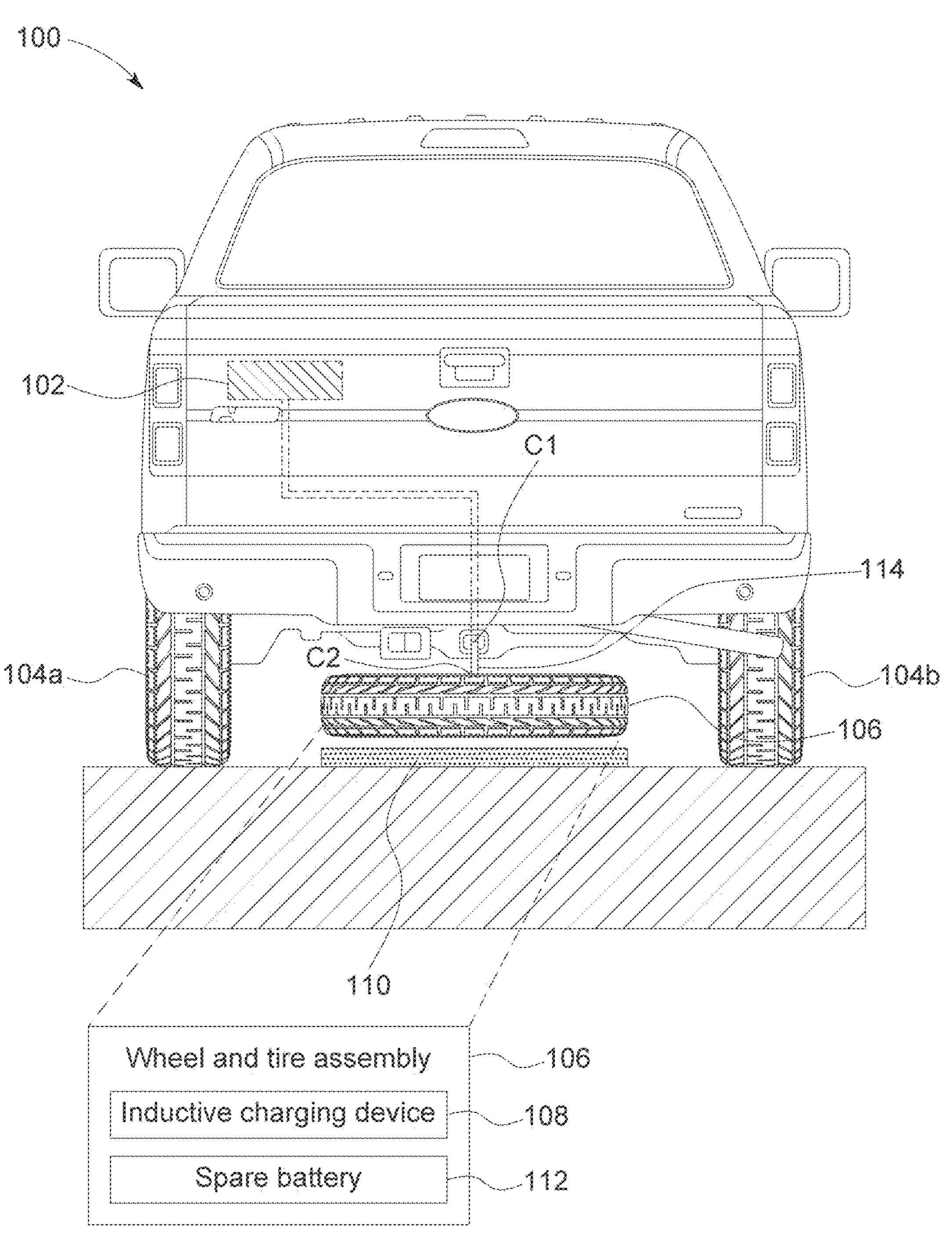
FIG. 1 depicts an example vehicle in accordance with the present disclosure.

The present disclosure describes a spare wheel tire assembly that may be mounted at an undercarriage of a vehicle, via a winch system. The spare wheel tire assembly may include an inductive charging device that may receive power from an external inductive power source, and transfer power to a vehicle main battery (or a traction battery). The inductive power source may include first electromagnetic coils (e.g., copper coils) and the inductive charging device may include second electromagnetic coils. The first and second electromagnetic coils may facilitate transfer of power magnetically or via induction from the inductive power source to the inductive charging device, when the inductive charging device and/or the vehicle may be positioned in proximity to the inductive power source. The spare wheel tire assembly may further include a spare battery that may receive power from the inductive charging device and store the received power, which may be provided to the vehicle main battery when required.

The winch system may include a plurality of components including, but not limited to, one or more cables, a crank or a motor that winds or unwinds the cable(s), a drum or pulley that facilitates the winding and unwinding of the cable(s), and/or the like. The winch system may control the movement of the spare wheel tire assembly. In some aspects, the winch system may move the spare wheel tire assembly vertically (e.g., closer to or away from the ground, such as from/to a stowed position to/from a resting position on the ground; and which may include some slop or sway depending on the conditions, and therefore should be construed to include substantially vertically) so that the inductive charging device may be positioned in proximity to and over the inductive power source (that may be positioned on the ground), thereby enabling the spare wheel tire assembly to receive power from the inductive power source. The winch system may further enable power transfer between the spare wheel tire assembly and the vehicle main battery.

In some aspects, the winch system may include a single cable that may vertically move the spare wheel tire assembly between a lowered position and a stowed position, and enable power transfer between the spare wheel tire assembly (e.g., via the inductive charging device and/or the spare battery) and the vehicle main battery. In this case, the single cable may include electrical conductors that may enable the power transfer. In other aspects, the winch system may include different cables, e.g., a first cable and a second cable, to cause the vertical movement of the spare wheel tire assembly and enable the power transfer. In this case, the first cable may vertically move the spare wheel tire assembly closer to or away from the ground, and the second cable may enable the power transfer between the spare wheel tire assembly and the vehicle main battery. In this exemplary aspect, the second cable may include electrical conductors that may enable the power transfer, and the first cable may not include the electrical conductors.

The vehicle may further include a tire management unit that may operate the winch system (including the cable(s) described above). The unit may control the vertical movement of the spare wheel tire assembly via the winch system to align the inductive charging device with the inductive power source. In some aspects, the unit may cause the spare wheel tire assembly to move to the lowered position, via the winch system, to receive power. In the lowered position, the inductive charging device included in the spare wheel tire assembly may be disposed in proximity to the inductive power source and may hence receive power from the inductive power source via induction, as described above. The unit may further enable the power transfer from the inductive charging device to the vehicle main battery via the winch system, when the spare wheel tire assembly is in the lowered position.

In further aspects, the unit may cause the induction charging device included in the spare wheel tire assembly to receive power from the induction charging device, and store the power in the spare battery. The power stored in the spare battery may be used at a later stage to transfer power to the vehicle main battery via the cable, when required. The unit may enable the power transfer from the spare battery to the vehicle main battery when the spare wheel tire assembly is in the stowed position.

In some aspects, the unit may prevent vehicle movement when the spare wheel tire assembly is in the lowered position. In this case, in one exemplary aspect, when the user attempts to move the vehicle and the spare wheel tire assembly is in the lowered position, the unit may automatically move the spare wheel tire assembly to the stowed position. In another exemplary aspect, the unit may disengage the spare wheel tire assembly from the cable when the user attempts to move the vehicle and the spare wheel tire assembly is in the lowered position.

The present disclosure discloses a vehicle that enables vehicle charging by using the vehicle's spare wheel tire assembly and a winch system. The vehicle enables easy connection of power transfer devices (e.g., the induction power source) when the spare wheel tire assembly is in the lowered position. The present disclosure further enables the spare wheel tire assembly to transfer power to another vehicle.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example vehicle 100 in accordance with the present disclosure. While describing FIG. 1, references may be made to FIGS. 2, 3 and 4. The vehicle 100 may take the form of any passenger or commercial vehicle such as a car, a work vehicle, a crossover vehicle, a van, a minivan, a taxi, a bus, etc. Further, the vehicle 100 may be a manually-driven vehicle, and/or be configured to operate in a fully autonomous (e.g., driverless) mode and/or partially autonomous mode. In some aspects, the vehicle 100 may be an Electric Vehicle (EV) or a hybrid vehicle. The vehicle may include a vehicle main battery 102 (or a traction battery) that may provide energy for vehicle propulsion.

The vehicle 100 may include four main wheel tire assemblies 104*a*, 104*b*, etc. (hereinafter referred to as main wheel tire assembly 104) having respective tires and wheels, which may be connected to respective vehicle axles. The vehicle 100 may further include a spare wheel tire assembly 106 (or a spare wheel and tire assembly 106) having a tire and a wheel. The spare wheel tire assembly 106 may be positioned anywhere on the vehicle 100, and may be connected to the vehicle axle if required (e.g., when any one main wheel tire assembly 104 may not work as per requirement). In some aspects, the spare wheel tire assembly 106 may be positioned/mounted on a vehicle component that may include, but is not limited to, a vehicle bed, a vehicle carrier or a chase rack located at a vehicle back portion (e.g., a vehicle tailgate), and/or the like. In an exemplary aspect, the spare wheel tire assembly 106 may be positioned/mounted at an undercarriage of the vehicle 100, as shown in FIG. 1.

The vehicle 100 may further include an inductive charging device 108 that may be mounted in and be a part of the spare wheel tire assembly 106. In some aspects, the inductive charging device 108 may be mounted at the center of a wheel in the spare wheel tire assembly 106, as disclosed in the U.S. patent application Ser. No. 18/943,658, filed on Nov. 11, 2024, which is incorporated by reference in its entirety in the present disclosure.

The inductive charging device 108 may receive power from an inductive power source 110 that may be positioned on the ground (or be part of the road on which the vehicle 100 may be located). In some aspects, the inductive power source 110 may be positioned under the ground. The inductive power source 110 may be a static or movable device. The inductive charging device 108 may receive power from the inductive power source 110 when the inductive charging device 108 and/or the vehicle 100 may be positioned in proximity to and over the inductive power source 110. The inductive power source 110 may include first electromagnetic coils (e.g., copper coils) and the inductive charging device 108 may include second electromagnetic coils, which may facilitate transfer of power magnetically or via induction from the inductive power source 110 to the inductive charging device 108, when the inductive charging device 108 and/or the vehicle 100 is positioned over the inductive power source 110. The inductive charging device 108 (or the vehicle 100) may not be required to be connected via wires with the inductive power source 110 to enable reception of power, and the inductive power source 110 may facilitate "wireless" transfer of power to the inductive charging device 108. Stated another way, the inductive charging device 108 may receive power from the inductive power source 110 wirelessly when the inductive charging device 108 is disposed within a predetermined distance of the inductive power source 110.

The inductive charging device 108 may be connected to the vehicle main battery 102 (via a winch system described later below) and may transfer power to the vehicle main battery 102 to charge the vehicle main battery 102. In some aspects, the inductive charging device 108 may provide power to other vehicle components/accessories as well, to enable their operations. In further aspects, the inductive charging device 108 may provide power to other vehicles as well, and is not limited to providing power only to the vehicle 100 (or only to the vehicle main battery 102).

In further aspects, the vehicle 100 may include a spare battery 112 that may be mounted in the spare wheel tire assembly 106. The spare battery 112 may receive power from the inductive charging device 108 and store the received power. In further aspects, the spare battery 112 may transfer power to the vehicle main battery 102, when required. In some aspects, the spare battery 112 may provide power to other vehicle components/accessories as well, and may also provide power to other vehicles (when required). In additional aspects, the spare battery 112 may receive power from the vehicle main battery 102 as well (if required).

The vehicle 100 may further include a winch system or hoist (shown as winch system 240 in FIG. 2) that may connect the spare wheel tire assembly 106 to the vehicle's undercarriage. The winch system may enable a user to vertically move the spare wheel tire assembly 106 closer to ground (and away from the vehicle's undercarriage) or away from the ground (and towards the vehicle's undercarriage). When the user desires to access the spare wheel tire assembly 106, the winch system may lower the spare wheel tire assembly 106 to move closer to the ground. After the spare wheel tire assembly 106 is used, the winch system may raise the spare wheel tire assembly 106 back into its original position underneath the vehicle 100. The winch system may include a plurality of components including, but not limited to, one or more cables (e.g., a cable 114 shown in FIG. 1), a crank or motor that winds or unwinds the cable(s), a drum or pulley that may facilitate the winding and unwinding of the cable(s), and/or the like.

Figure 4:
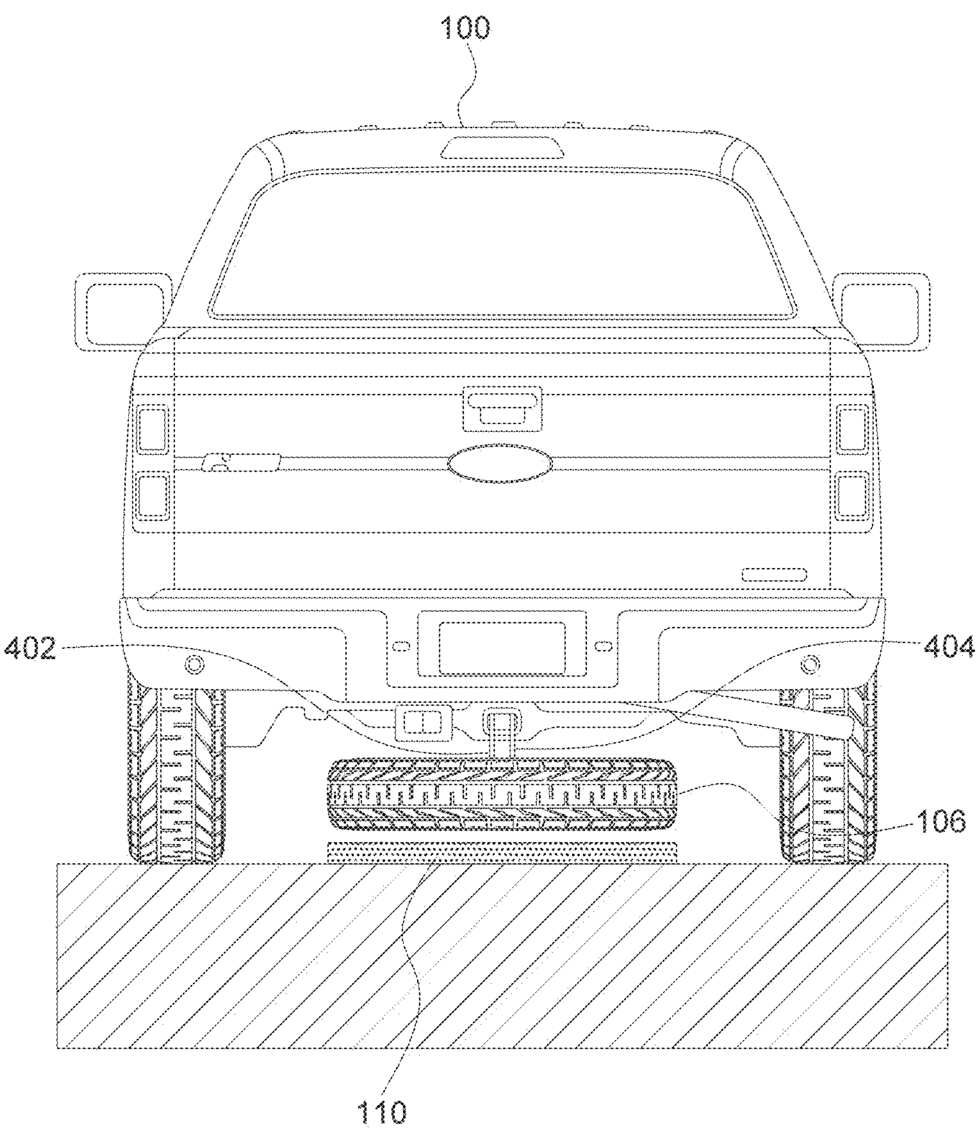
FIG. 4 depicts an example connection of a spare wheel tire assembly in accordance with the present disclosure.

In an exemplary aspect, the winch system may include a single cable (i.e., the cable 114 shown in FIG. 1) that may vertically move the spare wheel tire assembly 106 between a lowered position and a stowed position, and enable power transfer between the spare wheel tire assembly 106 and the vehicle main battery 102. In this aspect, the cable 114 may include electrical conductors that may enable the power transfer. In another aspect, the winch system may include two different cables e.g., a first cable 402 and a second cable 404, as shown in FIG. 4. The first cable may vertically move the spare wheel tire assembly 106 between the lowered and stowed position, and the second cable may enable the power transfer between the spare wheel tire assembly 106 and the vehicle main battery 102. In this aspect, the second cable may include the electrical conductors that enable the power transfer, and the first cable may not include any electrical conductor. The aspect of different cables is described later below in conjunction with FIG. 4.

Figure 3:
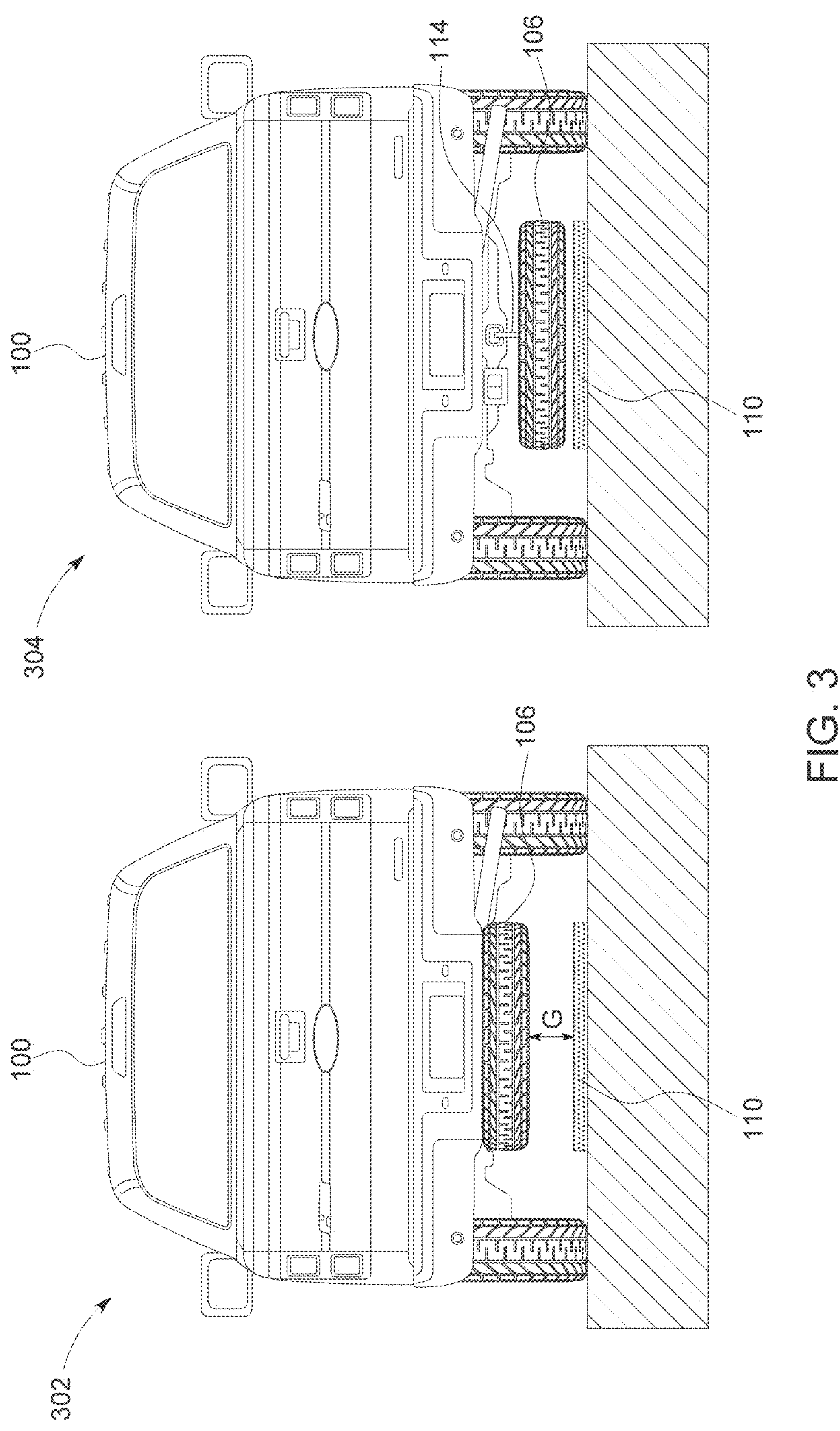
FIG. 3 depicts example views of a spare wheel tire assembly in a lowered position and a stowed position in accordance with the present disclosure.

In some aspects, the spare wheel tire assembly 106 may be mounted at the vehicle's undercarriage and may contact the undercarriage when the spare wheel tire assembly 106 may be in the stowed position, as shown in a view 302 of FIG. 3. A gap "G" may exist between the ground (or the inductive power source 110) and the spare wheel tire assembly 106 when the spare wheel tire assembly 106 is in the stowed position. Further, the spare wheel tire assembly 106 may be located in proximity to the ground when the spare wheel tire assembly 106 may be in the lowered position, as shown in a view 304 of FIG. 3. The spare wheel tire assembly 106 may effectively receive power from the inductive power source 110 when the spare wheel tire assembly 106 is in the lowered position, as in this position, the inductive charging device 108 is in proximity to or contacts the inductive power source 110.

In some aspects, the user (or the vehicle 100) may move the spare wheel tire assembly 106 away from the vehicle 100 and position the spare wheel tire assembly 106 over the inductive power source 110 when the spare wheel tire assembly 106 is in the lowered position. In this case, the spare wheel tire assembly 106 may still be connected to the vehicle 100 via the winch system (e.g., the cable 114), however, the spare wheel tire assembly 106 may be physically disposed some distance away from the vehicle 100. In this scenario, the winch system may unwind the cable 114 to allow the user (or the vehicle 100) to move the spare wheel tire assembly 106 away from the vehicle 100, up to a predetermined distance (that may be equivalent to a cable length).

As described above, in one exemplary aspect, the cable 114 may enable power transfer between the spare wheel tire assembly 106 and the vehicle main battery 102. The cable 114 may include electrical conductors that may facilitate the power transfer. Specifically, the cable 114 may enable power transfer from the inductive charging device 108 to the vehicle main battery 102. Stated another way, the inductive charging device 108 may transfer power to the vehicle main battery 102 via the cable 114. In additional aspects, the cable 114 may enable power transfer from the spare battery 112 to the vehicle main battery 102. Stated another way, in this case, the spare battery 112 may transfer power to the vehicle main battery 102 via the cable 114. In some aspects, the cable 114 may enable power transfer from the vehicle main battery 102 to the spare battery 112 as well.

The cable 114 may include a first connector "C1" at a cable proximal end and a second connector "C2" at a cable distal end. The first connector "C1" may engage with the vehicle main battery 102 (e.g., via an internal wire), and the second connector "C2" may engage with the spare battery 112 and/or the inductive charging device 108 to facilitate the power transfer as described above. In some aspects, the spare battery 112 and/or the inductive charging device 108 may include electrical connectors that may engage with the second connector "C2" to enable power transfer between the spare wheel tire assembly 106 (i.e., the spare battery 112 and/or the inductive charging device 108) and the vehicle main battery 102. In other aspects, the spare battery 112 and/or the inductive charging device 108 may include inductive power transfer pads that may engage with the second connector "C2" (which may also include inductive power transfer pads) to enable power transfer between the spare wheel tire assembly 106 and the vehicle main battery 102. In this case, the inductive power transfer pads may be engineered to contact when the winch system is engaged or magnetically coupled or attached via another mechanical means such as bolts or other threaded fasteners.

The vehicle 100 may further include a tire management unit (shown as tire management unit 212 in FIG. 2) that may operate the winch system (including the cable(s) described above). In some aspects, the unit may control the vertical movement of the spare wheel tire assembly 106 between the lowered position and the stowed position. In addition, the unit may enable the power transfer between the spare wheel tire assembly 106 and the vehicle main battery 102. For instance, the unit may lower the spare wheel tire assembly 106 to enable the user to access the spare wheel tire assembly 106 or to enable the spare wheel tire assembly 106 to receive power from the inductive power source 110, e.g., based on user's inputs via a vehicle Human-Machine Interface, a user device, etc. The unit may further position the spare wheel tire assembly 106 such that the inductive charging device 108 may be aligned with the inductive power source 110, to facilitate effective power transfer. The unit may further control the power transfer (a transfer rate, etc.) from the inductive charging device 108 (or the spare battery 112) to the vehicle main battery 102.

In further aspects, the unit may prevent vehicle movement when the spare wheel tire assembly 106 may be in the lowered position. In this case, in one exemplary aspect, when the user attempts to move the vehicle 100 and the spare wheel tire assembly 106 is in the lowered position, the unit may automatically move the spare wheel tire assembly 106 to the stowed position, to prevent any adverse situation. In another exemplary aspect, the unit may disengage the spare wheel tire assembly 106 and the cable 114 when the user attempts to move the vehicle 100 and the spare wheel tire assembly 106 is in the lowered position.

Further vehicle 100 details are described below in conjunction with FIG. 2.

The vehicle 100 and the unit may implement and/or perform operations, as described here in the present disclosure, in accordance with the owner manual and safety guidelines. In addition, any action taken by the user based on the notifications provided by the vehicle 100 should comply with all the rules specific to the location and operation of the vehicle 100 (e.g., Federal, state, country, city, etc.). The notifications, as provided by the vehicle 100 should be treated as suggestions and only followed according to any rules specific to the location and operation of the vehicle 100.

Figure 2:
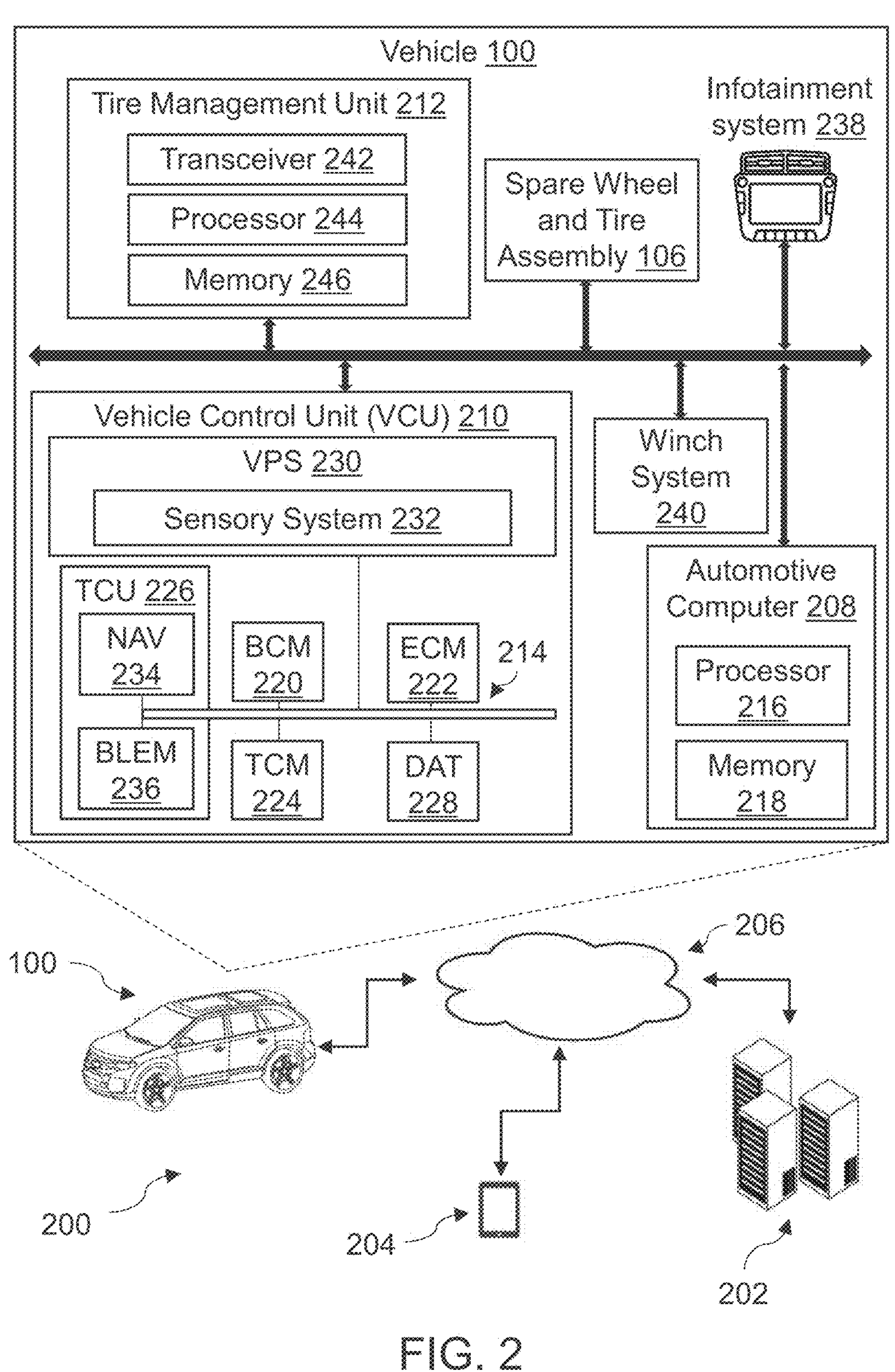
FIG. 2 depicts a block diagram of a system to facilitate power transfer between a spare wheel tire assembly and a vehicle main battery in accordance with the present disclosure.

FIG. 2 depicts a block diagram of a system 200 to facilitate power transfer between the spare wheel tire assembly 106 and the vehicle main battery 102 in accordance with the present disclosure. While describing FIG. 1, references will be made to FIG. 3.

The system 200 may include the vehicle 100 (and other vehicles, not shown in FIG. 2), one or more servers 202 (or a server 202) and a user device 204 that may be communicatively coupled with each other via one or more networks 206. The user device 204 may be associated with the vehicle user (e.g., a vehicle operator), and may include, for example, a mobile phone, a computer, a laptop, a tablet, a smartwatch or any other device with communication capabilities. The server 202 may be part of a cloud-based computing infrastructure and may be associated with and/or include a Telematics Service Delivery Network (SDN) that provides digital data services to the vehicle 100 and other vehicles that may be part of a vehicle fleet.

In further aspects, the server 202 may store information associated with the induction power source 110, such as information about the capacity, the installed location, etc. of the induction power source 110. The server 202 may transmit this information to the vehicle 100 when the vehicle 100 transmits a request to the server 202 to receive such information. In an exemplary aspect, the vehicle 100 may transmit such a request to the server 202 when, for example, the user may desire to charge the vehicle main battery 102 via the induction power source 110.

The network(s) 206 illustrates an example communication infrastructure in which the connected devices discussed in various embodiments of this disclosure may communicate. The network(s) 206 may be and/or include the Internet, a private network, public network or other configuration that operates using any one or more known communication protocols such as transmission control protocol/Internet protocol (TCP/IP), Bluetooth®, Bluetooth Low Energy (BLE), Wi-Fi based on the Institute of Electrical and Electronics Engineers (IEEE) standard 802.11, Ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 100 may include a plurality of units including, but not limited to, an automotive computer 208, a Vehicle Control Unit (VCU) 210 and a tire management unit 212 (or unit 212). The VCU 210 may include a plurality of Electronic Control Units (ECUs) 214 in communication with the automotive computer 208.

In some aspects, the automotive computer 208 and/or the unit 212 may be installed anywhere in the vehicle 100, in accordance with the disclosure. Further, the automotive computer 208 may operate as a functional part of the unit 212. The automotive computer 208 may be or include an electronic vehicle controller, having one or more processor(s) 216 and a memory 218. Moreover, the unit 212 may be separate from the automotive computer 208 (as shown in FIG. 2) or may be integrated as part of the automotive computer 208.

The processor(s) 216 may be in communication with one or more memory devices in communication with the respective computing systems (e.g., the memory 218 and/or one or more external databases not shown in FIG. 2). The processor(s) 216 may utilize the memory 218 to store programs in code and/or to store data for performing aspects in accordance with the disclosure. The memory 218 may be a non-transitory computer-readable medium or memory storing a tire management program code. The memory 218 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 210 may share a power bus with the automotive computer 208 and may be configured and/or programmed to coordinate the data between vehicle 100 systems, connected servers (e.g., the server(s) 202), and other vehicles operating as part of a vehicle fleet. The VCU 210 may include or communicate with any combination of the ECUs 214, such as a Body Control Module (BCM) 220, an Engine Control Module (ECM) 222, a Transmission Control Module (TCM) 224, a Telematics Control Unit (TCU) 226, a Driver Assistances Technologies (DAT) controller 228, etc.

The VCU 210 may further include and/or communicate with a Vehicle Perception System (VPS) 230, having connectivity with and/or control of one or more vehicle sensory system(s) 232 (or a "sensor unit"). The vehicle sensory system 232 may include one or more vehicle sensors including, but not limited to, a radio detection and ranging (radar) sensor configured for detection and localization of objects inside and outside the vehicle 100 using radio waves, sitting area buckle sensors, sitting area sensors, a light detecting and ranging (lidar) sensor, door sensors, proximity sensors, temperature sensors, tilt and motion sensors, wheel sensors, ambient weather sensors, ambient light sensors, vehicle internal and external cameras, one or more rain sensors, a humidity sensor, a tire pressure sensor, ultrasonic sensors, etc. In some aspects, the vehicle sensory system 232 may capture inputs (e.g., images) associated with vehicle surroundings. For example, the vehicle exterior cameras may capture images of an area/space around the vehicle 100, which may assist the vehicle 100 in positioning the induction charging device 108 over the induction power source 110.

In some aspects, the VCU 210 may control vehicle operational aspects and implement one or more instruction sets received from the user device 204, from one or more instruction sets stored in the memory 218, including instructions operational as part of the unit 212.

The TCU 226 may be configured and/or programmed to provide vehicle connectivity to wireless computing systems onboard and off board the vehicle 100 and may include a Navigation (NAV) receiver 234 for receiving and processing a GPS signal, a BLE Module (BLEM) 236, a Wi-Fi transceiver, a UWB transceiver, and/or other wireless transceivers (not shown in FIG. 2) that may be configurable for wireless communication (including cellular communication) between the vehicle 100 and other systems (e.g., the user device 204, a key fob, an NFC device, etc.), computers, and modules. The NAV receiver 234 may determine a real-time vehicle geolocation. The TCU 226 may be in communication with the ECUs 214 by way of a bus.

The ECUs 214 may control aspects of vehicle operation and communication using inputs from human drivers, inputs from an autonomous vehicle controller, the unit 212, and/or via wireless signal inputs received via the wireless connection(s) from other connected devices, such as the user device 204, the server(s) 202, among others.

The BCM 220 generally includes integration of sensors, vehicle performance indicators, and variable reactors associated with vehicle systems and may include processor-based power distribution circuitry that can control functions associated with the vehicle body such as lights, windows, security, camera(s), fan, headlights, audio system(s), speakers, wipers, door locks and access control, mirrors, various comfort controls, enclosures, a winch system 240 and/or the like. The BCM 220 may also operate as a gateway for bus and network interfaces to interact with remote ECUs (not shown in FIG. 2).

The DAT controller 228 may provide Level-1 through Level-3 automated driving and driver assistance functionality that may include, for example, active parking assistance, vehicle backup assistance, and adaptive cruise control, among other features. The DAT controller 228 may also provide aspects of user and environmental inputs usable for user authentication.

In some aspects, the automotive computer 208 may connect with an infotainment system 238 (or a vehicle Human-Machine Interface (HMI) 238). The infotainment system 238 may include a touchscreen interface portion and may include voice recognition features, biometric identification capabilities that can identify users based on facial recognition, voice recognition, fingerprint identification, or other biological identification means. In other aspects, the infotainment system 238 may further receive user instructions/inputs via the touchscreen interface portion and/or display notifications/recommendations, navigation maps, etc. on the touchscreen interface portion.

The vehicle 100 may further include the vehicle main battery 102, the spare wheel tire assembly 106, and the winch system 240 (that includes the cable 114).

The computing system architecture of the automotive computer 208, the VCU 210, and/or the unit 212 may omit certain computing modules. It should be readily understood that the computing environment depicted in FIG. 2 is an example of a possible implementation according to the present disclosure, and thus, it should not be considered limiting or exclusive.

In accordance with some aspects, the unit 212 may be integrated with and/or executed as part of the ECUs 214. The unit 212, regardless of whether it is integrated with the automotive computer 208 or the ECUs 214, or whether it operates as an independent computing system in the vehicle 100, may include a transceiver 242, a processor 244, and a computer-readable memory 246.

The transceiver 242 may receive information/inputs from one or more external devices or systems, e.g., the user device 204, the server(s) 202, and/or the like via the network 206. For example, the transceiver 242 may receive inputs from the user via the user device 204 and the network 206. Further, the transceiver 242 may transmit notifications to the external devices or systems. In addition, the transceiver 242 may receive information/inputs from vehicle 100 components such as the infotainment system 238, the VCU 210, the vehicle main battery 102 (e.g., receive a real-time battery SoC level from the vehicle main battery 102), the spare wheel tire assembly 106 (e.g., receive a real-time battery SoC level from the spare battery 112, working condition of the induction charging device 108, etc.), and/or the like. Further, the transceiver 242 may transmit notifications/command signals to the vehicle 100 components such as the VCU 210, the infotainment system 238, the BCM 220 (e.g., to control the winch system 240), etc.

The processor 244 and the memory 246 may be the same as or similar to the processor 216 and the memory 218, respectively. In some aspects, the processor 244 may utilize the memory 246 to store programs in code and/or to store data for performing aspects in accordance with the disclosure. The memory 246 may be a non-transitory computer-readable medium or memory storing the tire management program code.

In operation, the processor 244 may receive a trigger signal to charge the vehicle main battery 102 via the spare wheel tire assembly 106. In some aspects, the processor 244 may receive the trigger signal from the user via the user device 204 or the infotainment system 238 when the user desires to charge the vehicle main battery 102 via the spare wheel tire assembly 106 (e.g., when the State of Charge (SOC) level of the vehicle main battery 102 may be less than a threshold value). In other aspects, the processor 244 may receive the trigger signal from any other vehicle component when the SOC level of the vehicle main battery 102 may be less than the threshold value.

Responsive to receiving the trigger signal, the processor 244 may determine the location of the induction power source 110 via the information obtained from the server 202. Responsive to determining the location, the processor 244 may assist the user to move the spare wheel tire assembly 106 (and/or the vehicle 100) over the induction power source 110. Alternatively, the processor 244 may automatically move the spare wheel tire assembly 106 (e.g., via the winch system 240) and/or the vehicle 100 over the induction power source 110. When the spare wheel tire assembly 106 may be aligned with the induction power source 110, the processor 244 may cause the lowering of the spare wheel tire assembly 106 (via the winch system 240) and may position the spare wheel tire assembly 106 above and in proximity to (e.g., touching) the induction power source 110, to enable effective wireless power transfer from the induction power source 110 to the induction charging device 108. Stated another way, when the spare wheel tire assembly 106 may be aligned with the induction power source 110, the processor 244 may cause, via the winch system 240, the spare wheel tire assembly 106 to move to the lowered position (as shown in the view 304 of FIG. 3).

In some aspects, the processor 244 may cause the spare wheel tire assembly 106 to move to the lowered position based on user's inputs/instructions. Responsive to the spare wheel tire assembly 106 being moved to the lowered position, the processor 244 may cause the induction charging device 108 to transfer the power (that the induction charging device 108 receives from the induction power source 110) to the vehicle main battery 102, via the winch system 240 (e.g., the cable 114). In some aspects, when the induction charging device 108 receives power from the induction power source 110, the spare wheel tire assembly 106 may still be connected to the winch system 240 (e.g., the cable 114), which may enable power transfer from the induction charging device 108 to the vehicle main battery 102. In this manner, the processor 244 enables power transfer via the spare wheel tire assembly 106 and the winch system 240 (e.g., the cable 114), when the spare wheel tire assembly 106 is in the lowered position. Thus, the spare wheel tire assembly 106 may wirelessly receive power from the induction power source 110 and supply the received power to the vehicle main battery 102 via a wired connection (e.g., via the cable 114).

In further aspects, the processor 244 may cause the induction charging device 108 to receive power from the induction power source 110, and store the received power in the spare battery 112. The power stored in the spare battery 112 may be used at a later stage to transfer power to the vehicle main battery 102 via the cable 114, when required. In some aspects, the processor 244 may cause/enable the power to transfer from the spare battery 112 to the vehicle main battery 102 when the spare wheel tire assembly 106 is in the stowed position. In this manner, power continuity may be maintained from the spare wheel tire assembly 106 even when the spare wheel tire assembly 106 is in the stowed position. In further aspects, the processor 244 may cause/ enable the power to transfer from the spare battery 112 to the vehicle main battery 102 even when the spare wheel tire assembly 106 is in the lowered position.

In some aspects, the processor 244 may output an alert notification to the user, via the user device 204 or the infotainment system 238, requesting the user not to move the vehicle 100 when the spare wheel tire assembly 106 is in the lowered position. In some aspects, the processor 244 may output the notification before lowering the spare wheel tire assembly 106. In addition, the processor 244 may disable the vehicle 100 from moving when the spare wheel tire assembly 106 is in the lowered position. In an exemplary aspect, the processor 244 may provide an override mechanism, which may enable the user to move the vehicle 100 in some situations, even when the spare wheel tire assembly 106 is in the lowered position.

In some aspects, when the user desires to move the vehicle 100 and the spare wheel tire assembly 106 is in the lowered position (e.g., use the override mechanism described above), the user may request or notify the processor 244 via the user device 204 or the infotainment system 238. In this case, the processor 244 may obtain a request (or a notification or a "first request") for vehicle movement from the user when the spare wheel tire assembly 106 is in the lowered position. The processor 244 may obtain the first request via the infotainment system 238 or the user device 204. Responsive to obtaining the first request, the processor 244 may perform one or more predetermined actions. In an exemplary aspect, the predetermined action may include automatically moving the spare wheel tire assembly 106 from the lowered position to the stowed position, via the winch system 240 (e.g., the cable 114), to prevent any adverse situation.

In another exemplary aspect, the predetermined action may include disengaging the winch system 240 (e.g., the cable 114) from the spare wheel tire assembly 106. The processor 244 may disengage the winch system 240 from the spare wheel tire assembly 106 by one or more different mechanisms. For example, the processor 244 may disengage via a quick disconnect mechanism, Pyrotechnics, Pyrotechnics bolts, Pyrotechnics shears, Pyrotechnics ejection mechanism, actuation-based mechanism, which may be part of the spare wheel tire assembly 106 and/or the winch system 240. In some aspects, the spare wheel tire assembly 106 and/or the winch system 240 may include a shearing mechanism that may cut the cable 114 when the user moves (or desires to move) the vehicle 100, to stop the power transfer immediately. In addition, the spare wheel tire assembly 106 and/or the winch system 240 may include a mechanism to shear the cable 114 similar to that used for SORB to deflate tires, to shear tow hook bolts in certain situations.

In further aspects, the processor 244 may disengage the winch system 240 from the spare wheel tire assembly 106 by a reusable actuator-based mechanism such as a grapple or claw (without the need of manual labor). The reusable actuator-based mechanism may further facilitate energy exchange between two vehicles (e.g., the vehicle 100 and other vehicle(s)). For instance, the reusable actuator-based mechanism may be used to drop off the spare wheel tire assembly 106 for charging, which may be picked up/recovered later. In this manner, the other vehicle(s) may use the spare wheel tire assembly 106 for charging or other purposes.

In further aspects, the processor 244 may receive a second request from the user to disengage the winch system 240 from the spare wheel tire assembly 106, e.g., when the user desires to use the spare wheel tire assembly 106 in the vehicle 100 (e.g., as a replacement for the main wheel tire assembly 104 or when the spare wheel tire assembly 106 is required to provide power to another vehicle). The processor 244 may receive the second request via the user device 204, the infotainment system 238, vehicle-to-vehicle (V2V) communication, vehicle-to-everything (V2X) communication, and/or the like. Responsive to receiving the second request, the processor 244 may disengage the spare wheel tire assembly 106 in the same manner described above. In further aspects, the processor 244 may activate lights to illuminate where the spare wheel tire assembly 106 is located, to facilitate the user in conveniently locating the spare wheel tire assembly 106 in the vehicle 100 (or any other location on the ground).

FIG. 4 depicts an example connection of the spare wheel tire assembly 106 in accordance with the present disclosure. In the exemplary aspect depicted in FIG. 4, the winch system 240 may include a first cable 402 and a second cable 404 (as opposed to a single cable 114, as described above). The first cable 402 may vertically move the spare wheel tire assembly 106 between the lowered position and the stowed position, shown in FIG. 3. The second cable 404 may include electrical conductors that may enable the power transfer between the spare wheel tire assembly 106 and the vehicle main battery 102. In this case, the inductive charging device 108 and/or the spare battery 112 may transfer power to the vehicle main battery 102 via the second cable 404. The second cable 404 may include the first connector "C1" at a proximal end and the second connector "C2" at a distal end. The first connector "C1" may engage with the vehicle main battery 102 and the second connector "C2" may engage with the spare battery 112 and/or the inductive charging device 108, to facilitate the power transfer as described above. In some aspects, in this case, when the user attempts to move the vehicle 100 when the spare wheel tire assembly 106 is in the lowered position, the processor 244 may disengage the spare wheel tire assembly 106 and both the cables (i.e., the first cable 402 and the second cable 404), to prevent any adverse situation.

Figure 5:
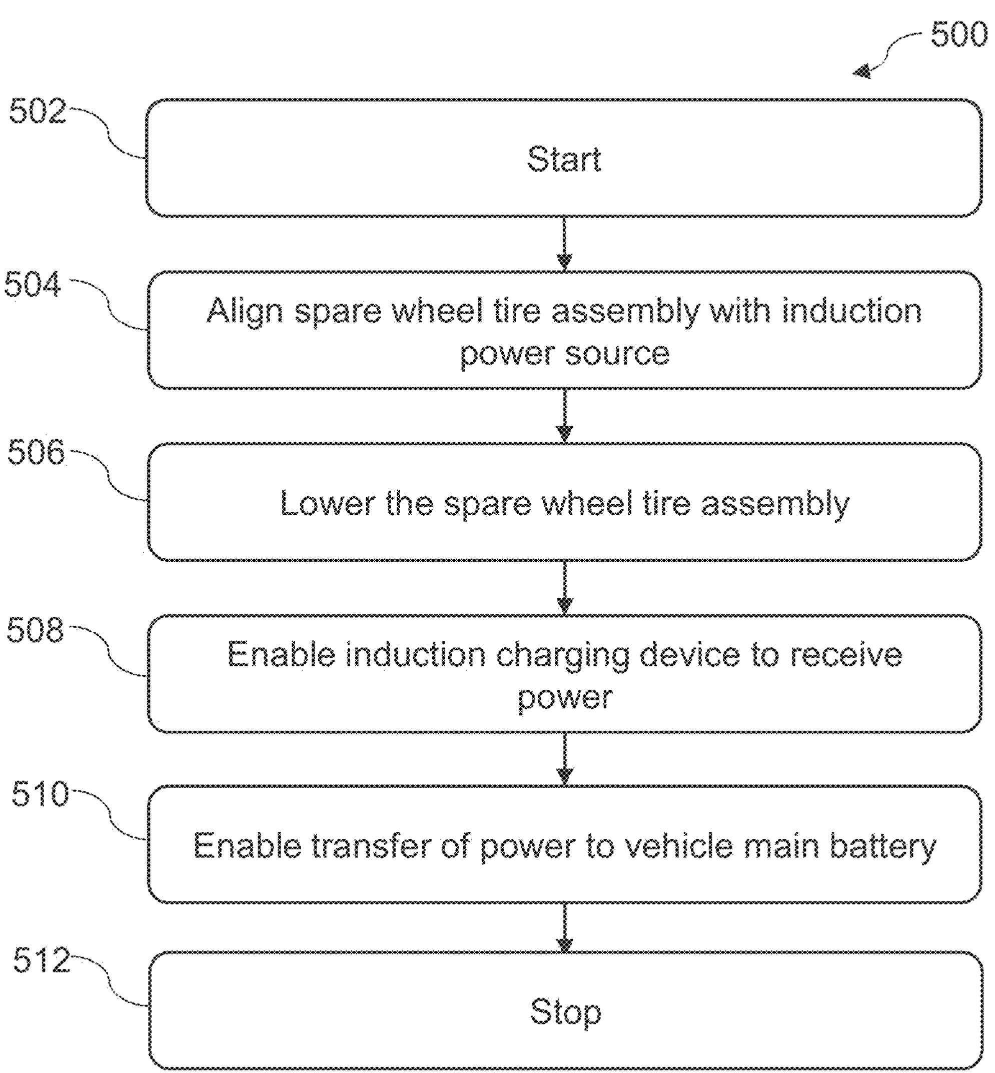
FIG. 5 depicts a flow diagram of an example method to facilitate power transfer between a spare wheel tire assembly and a vehicle main battery in accordance with the present disclosure.

FIG. 5 depicts a flow diagram of an example method 500 to facilitate power transfer between the spare wheel tire assembly 106 and the vehicle main battery 102 in accordance with the present disclosure. FIG. 5 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 500 starts at step 502. At step 504, the method 500 may include aligning, by the processor 244, the spare wheel tire assembly 106 with the inductive power source 110. For example, the processor 244 may cause the spare wheel tire assembly 106 (and/or the vehicle 100) to move and position over the inductive power source 110 at the step 504. When the spare wheel tire assembly 106 is aligned with the inductive power source 110, the processor 244 may move the spare wheel tire assembly 106 to the lowered position via the winch system 240, at step 506. At step 508, the method 500 may include enabling, by the processor 244, the induction charging device 108 to receive power via the cable 114 (or the second cable 404). At step 510, the method 500 may include enabling, by the processor 244, the power transfer to the vehicle main battery 102. For instance, the processor 244 may enable the power transfer from the induction charging device 108 or the spare battery 112 to the vehicle main battery 102 via the cable 114 (or the second cable 404).

At the step 512, the method 500 stops.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:

a vehicle main battery;

a wheel and tire assembly having a tire and a wheel;

an inductive charging device mounted in the wheel and tire assembly, wherein the inductive charging device is configured to receive power from an inductive power source and transfer power to the vehicle main battery; and a cable configured to:

vertically move the wheel and tire assembly between a lowered position and a stowed position; and enable power transfer between the wheel and tire assembly and the vehicle main battery.

2. The vehicle of claim 1, wherein the cable is a part of a winch system.

3. The vehicle of claim 1, wherein the inductive charging device is configured to transfer power to the vehicle main battery via the cable.

4. The vehicle of claim 1, further comprising a spare battery mounted in the wheel and tire assembly, wherein the spare battery is configured to receive power from the inductive charging device and transfer power to the vehicle main battery via the cable.

5. The vehicle of claim 4, wherein:

the cable comprises a first connector at a proximal end and a second connector at a distal end, the first connector is configured to engage with the vehicle main battery, and the second connector is configured to engage with at least one of the spare battery or the inductive charging device.

6. The vehicle of claim 4, wherein at least one of the spare battery or the inductive charging device comprises electrical connectors to enable power transfer between the wheel and tire assembly and the vehicle main battery.

7. The vehicle of claim 4, wherein at least one of the spare battery or the inductive charging device comprises inductive power transfer pads to enable power transfer between the wheel and tire assembly and the vehicle main battery.

8. The vehicle of claim 1, wherein the wheel and tire assembly is configured to be mounted at an undercarriage of the vehicle, and wherein the wheel and tire assembly contacts the undercarriage in the stowed position.

9. The vehicle of claim 1, further comprising a processor configured to:

receive a first request to move the vehicle when the wheel and tire assembly is in the lowered position; and perform a predetermined action responsive to receiving the first request.

10. The vehicle of claim 9, wherein the processor is configured to receive the first request via a vehicle Human-Machine Interface or a user device.

11. The vehicle of claim 9, wherein the predetermined action comprises automatically moving the wheel and tire assembly from the lowered position to the stowed position.

12. The vehicle of claim 9, wherein the predetermined action comprises disengaging the cable and the wheel and tire assembly.

13. The vehicle of claim 9, wherein the processor is further configured to:

receive a second request to disengage the cable and the wheel and tire assembly; and disengage the cable and the wheel and tire assembly responsive to receiving the second request.

14. The vehicle of claim 13, wherein the processor is configured to receive the second request via a user device, a vehicle-to-vehicle (V2V) communication, or a vehicle-to-everything (V2X) communication.

15. A vehicle comprising:

a vehicle main battery;

a wheel and tire assembly having a tire and a wheel;

an inductive charging device mounted in the wheel and tire assembly, wherein the inductive charging device is configured to receive power from an inductive power source and transfer power to the vehicle main battery;

a first cable configured to vertically move the wheel and tire assembly between a lowered position and a stowed position; and a second cable configured to enable power transfer between the wheel and tire assembly and the vehicle main battery.

16. The vehicle of claim 15, wherein the first cable and the second cable are part of a winch system.

17. The vehicle of claim 15, wherein the inductive charging device is configured to transfer power to the vehicle main battery via the second cable.

18. The vehicle of claim 15, further comprising a spare battery mounted in the wheel and tire assembly, wherein the spare battery is configured to receive power from the inductive charging device and transfer power to the vehicle main battery via the second cable.

19. The vehicle of claim 18, wherein:

the second cable comprises a first connector at a proximal end and a second connector at a distal end, the first connector is configured to engage with the vehicle main battery, and the second connector is configured to engage with at least one of the spare battery or the inductive charging device.

20. A vehicle comprising:

a vehicle main battery;

a wheel and tire assembly having a tire and a wheel;

an inductive charging device mounted in the wheel and tire assembly, wherein the inductive charging device is configured to receive power from an inductive power source; and a spare battery mounted in the wheel and tire assembly, wherein the spare battery is configured to receive power from the inductive charging device;

a cable configured to:

vertically move the wheel and tire assembly between a lowered position and a stowed position; and enable power transfer between the wheel and tire assembly and the vehicle main battery.

* * * * *